United States Patent
Ishii et al.

(10) Patent No.: US 9,940,548 B2
(45) Date of Patent: Apr. 10, 2018

(54) IMAGE RECOGNITION METHOD FOR PERFORMING IMAGE RECOGNITION UTILIZING CONVOLUTION FILTERS

(71) Applicant: Panasonic Intellectual Property Management Co., Ltd., Osaka (JP)

(72) Inventors: Yasunori Ishii, Osaka (JP); Sotaro Tsukizawa, Osaka (JP); Reiko Hagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/049,149

(22) Filed: Feb. 22, 2016

(65) Prior Publication Data

US 2016/0259995 A1    Sep. 8, 2016

(30) Foreign Application Priority Data

Mar. 6, 2015    (JP) ................................ 2015-045257
Aug. 7, 2015    (JP) ................................ 2015-156871

(51) Int. Cl.
*G06K 9/62*      (2006.01)
*G06K 9/46*      (2006.01)
*G06N 3/08*      (2006.01)

(52) U.S. Cl.
CPC ............. *G06K 9/6267* (2013.01); *G06K 9/46* (2013.01); *G06K 9/4628* (2013.01);
(Continued)

(58) Field of Classification Search
CPC ...... G06K 9/6267; G06K 9/46; G06K 9/6256; G06K 9/6274; G06K 9/4628; G06N 3/08
See application file for complete search history.

(56) References Cited

U.S. PATENT DOCUMENTS

2010/0223219 A1    9/2010   Kato et al.
2016/0259994 A1*   9/2016   Ravindran ........... G06K 9/6267
                                                       382/156
2017/0046616 A1*   2/2017   Socher ................... G06N 3/088

FOREIGN PATENT DOCUMENTS

CN        106570564    * 11/2016
JP         2014-049118     3/2014
WO       2008/153194     12/2008

OTHER PUBLICATIONS

Scherer, Dominik, Andreas Müller, and Sven Behnke. "Evaluation of pooling operations in convolutional architectures for object recognition." Artificial Neural Networks—ICANN 2010 (2010): 92-101.*

(Continued)

*Primary Examiner* — Bhavesh Mehta
*Assistant Examiner* — Menatoallah Youssef
(74) *Attorney, Agent, or Firm* — Greenblum & Bernstein, P.L.C.

(57) ABSTRACT

An image recognition method includes: receiving an image; acquiring processing result information including values of processing results of convolution processing at positions of a plurality of pixels that constitute the image by performing the convolution processing on the image by using different convolution filters; determining 1 feature for each of the positions of the plurality of pixels on the basis of the values of the processing results of the convolution processing at the positions of the plurality of pixels included in the processing result information and outputting the determined feature for each of the positions of the plurality of pixels; performing recognition processing on the basis of the determined feature for each of the positions of the plurality of pixels; and outputting recognition processing result information obtained by performing the recognition processing.

20 Claims, 15 Drawing Sheets

(52) U.S. Cl.
CPC ......... *G06K 9/6256* (2013.01); *G06K 9/6274* (2013.01); *G06N 3/08* (2013.01)

(56) References Cited

OTHER PUBLICATIONS

Zeiler, Matthew D., and Rob Fergus. "Visualizing and understanding convolutional networks." European conference on computer vision. Springer International Publishing, 2014.*
The Extended European Search Report from the European Patent Office (EPO) dated Jul. 15, 2016 for European Patent Application No. 16156617.9.
Christian Szegedy et al: "Going Deeper with Convolutions", Sep. 17, 2014 (Sep. 17, 2014), XP055230968, Retrieved from the Internet: URL:http://arxiv.org/pdf/1409.4842v1.pdf [retrieved on Nov. 24, 2015].
Lecun Y et al: "Gradient-Based Learning Applied to Document Recognition", Proceedings of the IEEE, vol. 86, No. 11, Nov. 1, 1998 (Nov. 1, 1998), pp. 2278-2323, XP000875095.
Sun Weichen et al: "Improving deep neural networks with multilayer maxout networks", IEEE Visual Communications and Image Processing Conference, Dec. 7, 2014 (Dec. 7, 2014), pp. 334-337, XP032741185.
Y-Lan Boureau et al.: "A Theoretical Analysis of Feature Pooling in Visual Recognition", 27th International Conference on Machine Learning, Jun. 21, 2010 (Jun. 21, 2010), pp. 1-8, XP055286960.
Ishii Yasunori et al: "Deep learning using heterogeneous feature maps for maxout networks", 2015 3rd IAPR Asian Conference on Pattern Recognition (ACPR), IEEE, Nov. 3, 2015 (Nov. 3, 2015), pp. 159-463, XP032910097.

* cited by examiner

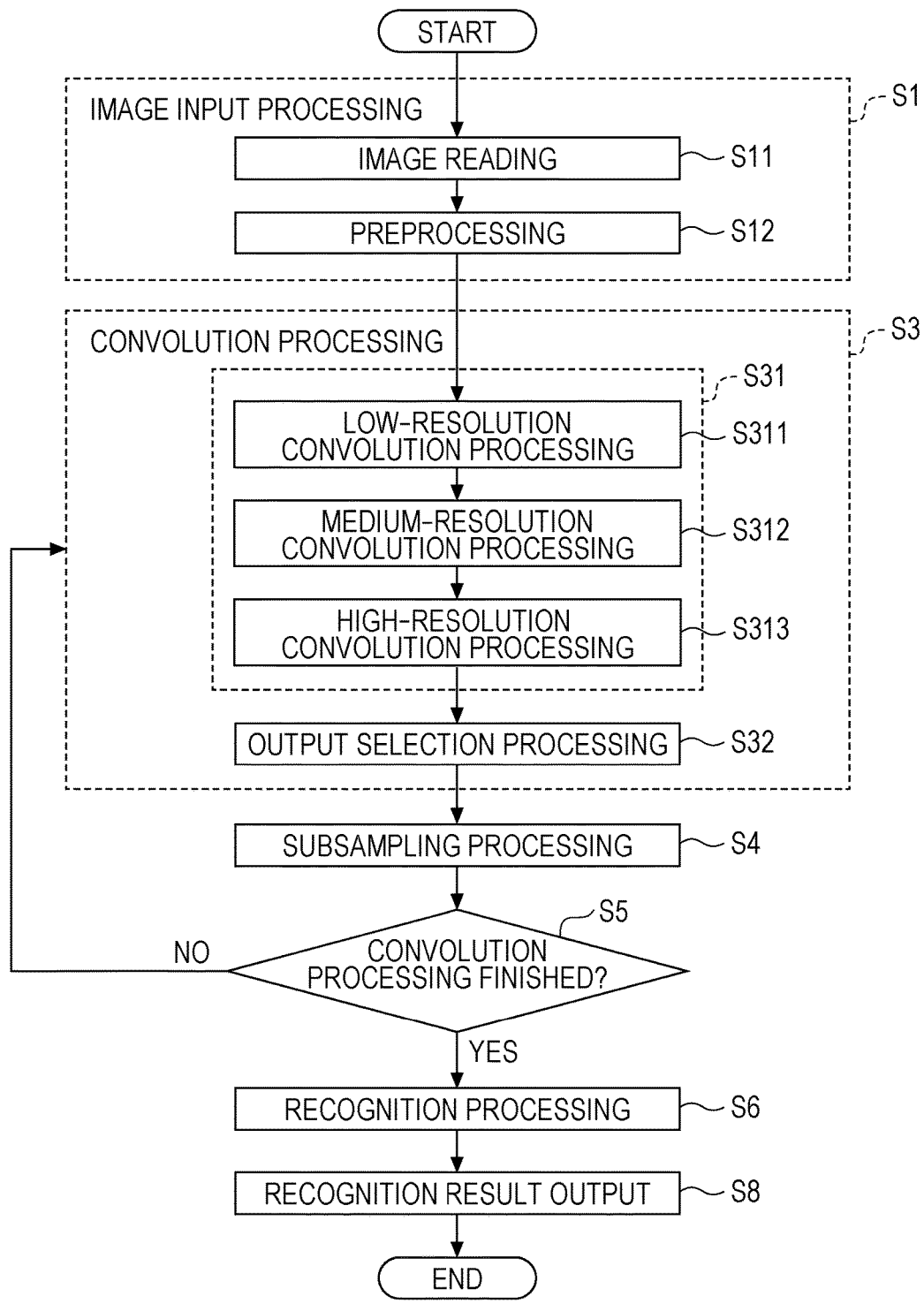

CONVOLUTION FILTER OF SECOND LAYER (Fx2, Fy2, N)

SUBSAMPLING RESULTS OF FIRST LAYER (N RESULTS)

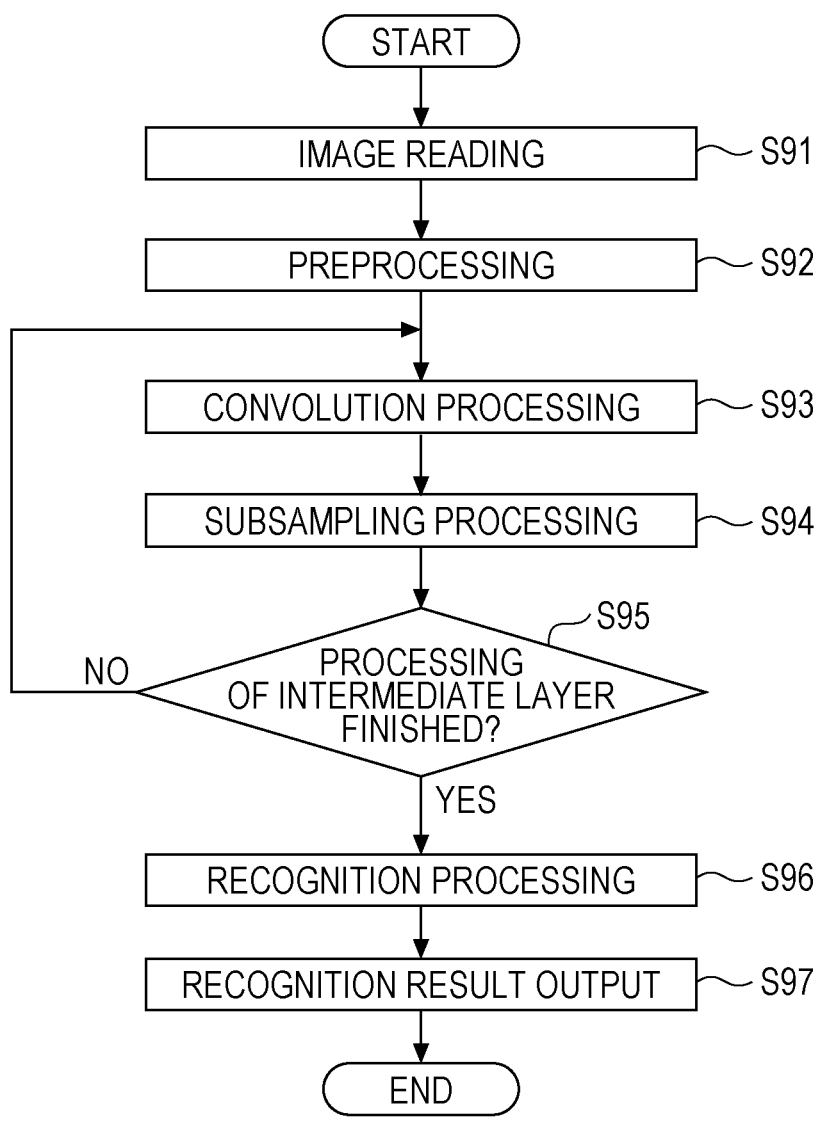

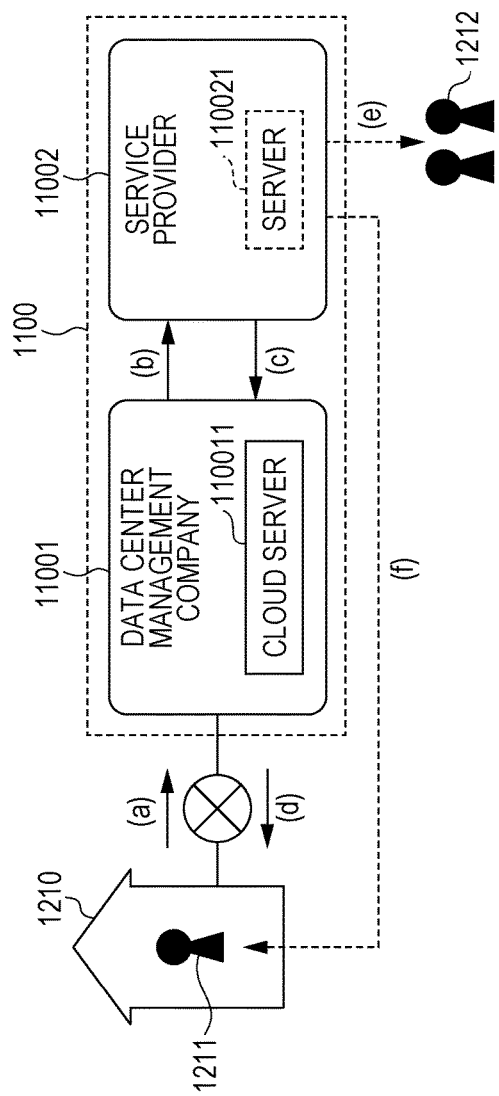
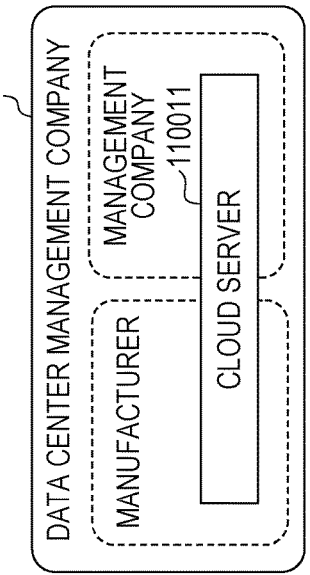
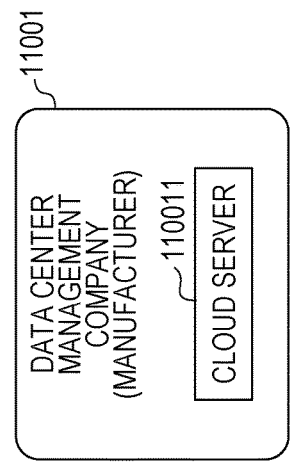

IMAGE RECOGNITION METHOD FOR PERFORMING IMAGE RECOGNITION UTILIZING CONVOLUTION FILTERS

BACKGROUND

1. Technical Field

The present disclosure relates to an image recognition method, an image recognition device, and a recording medium.

2. Description of the Related Art

In recent years, there are demands for high-speed and high-precision recognition of a variety of objects using an image recognition technique for recognizing what is in an image and where it is in the image. For example, Japanese Unexamined Patent Application Publication No. 2014-49118 discloses an image recognition technique that enables high-precision image recognition by using a plurality of convolutional neural network classifiers (hereinafter referred to as classifiers).

SUMMARY

In one general aspect, the techniques disclosed here feature an image recognition method performed by a computer of an image recognition device, including: receiving an image; acquiring processing result information including values of processing results of convolution processing at positions of a plurality of pixels that constitute the image by performing the convolution processing on the image by using different convolution filters; determining 1 feature for each of the positions of the plurality of pixels on the basis of the values of the processing results of the convolution processing at the positions of the plurality of pixels included in the processing result information and outputting the determined feature for each of the positions of the plurality of pixels; performing recognition processing on the basis of the determined feature for each of the positions of the plurality of pixels; and outputting recognition processing result information obtained by performing the recognition processing.

According to the present disclosure, it is possible to provide an image recognition method and the like that enables high-speed and high-precision image recognition.

It should be noted that general or specific embodiments may be implemented as a system, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a flow chart illustrating details of the operation of FIG. 6;

FIG. 12 is a flow chart for explaining recognition processing performed by the classification system according to the comparative example;

FIG. 13A is a diagram for explaining an example of a mode for providing a service by using a server;

FIG. 13B is a diagram for explaining an example of a mode for providing a service by using a server;

FIG. 13C is a diagram for explaining an example of a mode for providing a service by using a server;

DETAILED DESCRIPTION

Figure 1:
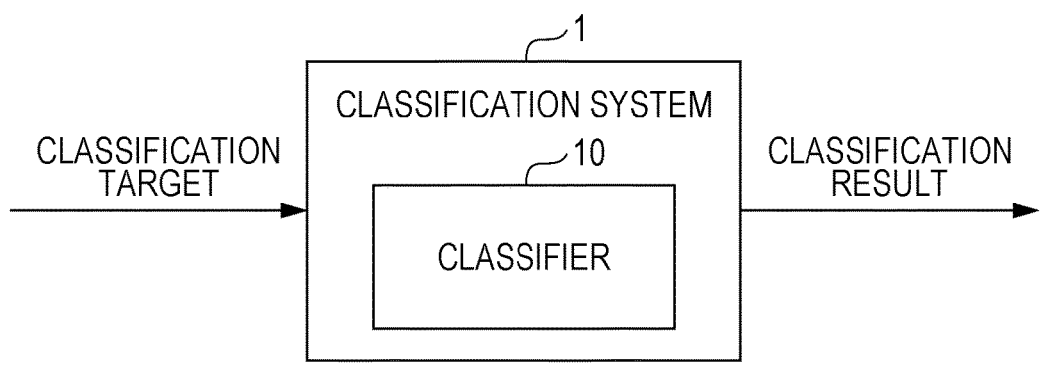
FIG. 1 is a block diagram illustrating an example of a configuration of a classification system according to an embodiment.

Underlying Knowledge Forming Basis of the Present Disclosure

The conventional technique has a problem that processing speed is low although high-precision image recognition is possible.

The image recognition technique generally includes two stages: (i) processing for extracting features from an image and (ii) processing for determining an object on the basis of the features. For example, in the feature extraction processing, convolution processing is performed, in which features, such as a distribution of luminance and a difference in luminance (edge), used for recognition are extracted from a recognition target object in an image. For example, in the determination processing, it is determined on the basis of the features extracted in the convolution processing whether or not the object is a recognition target by using a statistical machine learning method such as Boosting or SVM (Support Vector Machine).

Conventionally, a feature extraction filter (convolution filter) used in convolution processing is designed manually. In recent years, as a result of an improvement in photographic environments, realization of collection of a large volume of learning data over the Internet, and an improvement in infrastructure for large-scale calculators such as CPUs, methods for automatically design a feature extraction filter are being studied. Such methods are collectively called Deep Learning. In particular, in the field of image recognition, a convolutional neural network in which a feature extraction filter is regarded as convolution processing for a two-dimensional image is being studied as a Deep Learning technique. Among Deep Learning techniques, the convolutional neural network is compatible with image recognition and can improve precision while reducing the number of parameters.

However, resolution of a feature extraction filter (hereinafter also referred to as a convolution filter) used in a conventional convolutional neural network is a fixed value set by a user. This results in a problem that it is difficult to extract effective features that can be used for recognition from a recognition target object in a learning image if there is a large difference between resolution of a characteristic region of the learning image and resolution set by a user. A technical solution to such a problem has not been considered yet.

The present disclosure provides an image recognition method, an image recognition device, and a recording medium that enables high-speed and high-precision image recognition.

An image recognition method according to one aspect of the present disclosure is an image recognition method performed by a computer of an image recognition device, including: receiving an image; acquiring processing result information including values of processing results of convolution processing at positions of a plurality of pixels that constitute the image by performing the convolution processing on the image by using different convolution filters; determining 1 feature for each of the positions of the plurality of pixels on the basis of the values of the processing results of the convolution processing at the positions of the plurality of pixels included in the processing result information and outputting the determined feature for each of the positions of the plurality of pixels; performing recognition processing on the basis of the determined feature for each of the positions of the plurality of pixels; and outputting recognition processing result information obtained by performing the recognition processing.

Since information useful for recognition can be selectively used for each of positions of a plurality of pixels included in an input image from among a plurality of processing results calculated by performing convolution processing in parallel by using different convolution filters, it is possible to not only achieve high-speed image recognition, but also improve the precision of the image recognition.

It is therefore possible to provide an image recognition method that enables high-speed and high-precision image recognition.

Furthermore, for example, the image recognition method may be arranged such that the convolution processing using the different convolution filters is convolution processing that is performed on the image by using a plurality of convolution filters that are different in resolution or scale parameter.

According to the arrangement, convolution processing is performed by using convolution filters that are different in resolution or scale parameter (filter size). It is therefore possible to extract features effective for recognition even in a case where resolution of a characteristic region varies from one input image to another.

Furthermore, for example, the image recognition method may be arranged such that the convolution processing using the different convolution filters includes first convolution processing that is performed on the image by using a convolution filter having first resolution and a second convolution processing that is performed on the image by using a convolution filter having second resolution higher than the first resolution.

According to the arrangement, convolution processing is performed by using two different convolution filters that are different at least in resolution. It is therefore possible to extract features effective for recognition even in a case where resolution of a characteristic region varies from one input image to another.

Furthermore, for example, the image recognition method may be arranged such that the convolution processing using the different convolution filters is convolution processing that is performed on the image by using convolution filters that are different in color to be processed.

According to the arrangement, convolution processing is performed by using convolution filters that are different in color to be processed in order to distinguish objects on the basis of a difference in color. It is therefore possible to extract features effective for recognition even in a case where color of a characteristic region varies from one input image to another.

Furthermore, for example, the image recognition method may be arranged such that in the outputting the determined feature for each of the positions of the plurality of pixels, 1 feature for the position is determined by selecting, as the feature at the position, a maximum value among the values of the plurality of processing results at the position, and the determined feature for the position is output.

Furthermore, for example, the image recognition method may be arranged such that in the outputting the determined feature for each of the positions of the plurality of pixels, 1 feature for the position is determined by calculating a median or an average of the values of the plurality of processing results at the position and determining the calculated value as the feature at the position, and the determined feature at the position is output.

According to the arrangement, a maximum value, a median, or an average of values (output values) of processing results corresponding to each of the positions of pixels included in a plurality of pieces of processing result information obtained by performing convolution processing in parallel by using different convolution filters can be used as a feature corresponding to the position of the pixel. This makes it possible to select an appropriate feature in accordance with a target in an input image, thereby improving the precision of image recognition.

Furthermore, for example, the image recognition method may be arranged such that in the outputting the determined feature for each of the positions of the plurality of pixels, subsampling processing for determining, for each region including a plurality of adjacent pixels, any of the features at positions of the plurality of pixels included in the region as a representative feature representing the region; and the recognition processing is performed on the basis of the representative feature determined in the subsampling processing.

According to the arrangement, tolerance to position deviation of an input image and size deviation of an input image can be improved.

Furthermore, for example, the image recognition method may be arranged such that in the subsampling processing, a feature whose value is largest among the features at the positions of the plurality of pixels included in the region is determined as the representative feature.

Furthermore, for example, the image recognition method may be arranged such that at least one of the receiving the image, the acquiring the processing result information, the outputting the feature for each of the positions of the plurality of pixels, and the performing the recognition processing and outputting the recognition processing result information is performed by a processor provided in the computer of the image recognition device. Furthermore, for example, at least one of the receiving the image, the acquiring the processing result information, the determining the 1 feature for each of the positions of the plurality of pixels and the outputting the feature for each of the positions of the plurality of pixels, the performing the recognition processing and outputting the recognition processing result information may be performed by a processor provided in the computer of the image recognition device.

An image recognition device according to one aspect of the present disclosure includes an image input unit that receives an image; a convolution processor that acquires processing result information including values of processing results of convolution processing at positions of a plurality of pixels that constitute the image by performing the convolution processing on the image by using different convolution filters, determines 1 feature for each of the positions of the plurality of pixels on the basis of the values of the processing results of the convolution processing at the positions of the plurality of pixels included in the processing result information, outputs the determined feature for each of the positions of the plurality of pixels; a recognition processor that performs recognition processing on the basis of the feature for each of the positions of the plurality of pixels that is output by the convolution processor; and a recognition result output unit that outputs recognition processing result information obtained by performing the recognition processing in the recognition processor.

Furthermore, for example, the image recognition device may be arranged such that at least one of the image input unit, the convolution processor, the recognition processor, and the recognition result output unit includes a processor.

The embodiment described below is a specific example of the present disclosure. That is, numerical values, shapes, materials, constituent elements, steps, the order of steps, and the like described in the embodiment below are examples of the present disclosure and do not limit the present disclosure. Among the constituent elements in the embodiment below, constituent elements that are not described in the independent claims that show highest concepts of the present disclosure are described as optional constituent elements. The contents in all of the embodiments can be combined.

Embodiment

First, an image recognition method and the like according to a comparative example are described, and then an image recognition method and the like according to the present embodiment are described with reference to the drawings.

Configuration of Classification System 900

Figure 9:
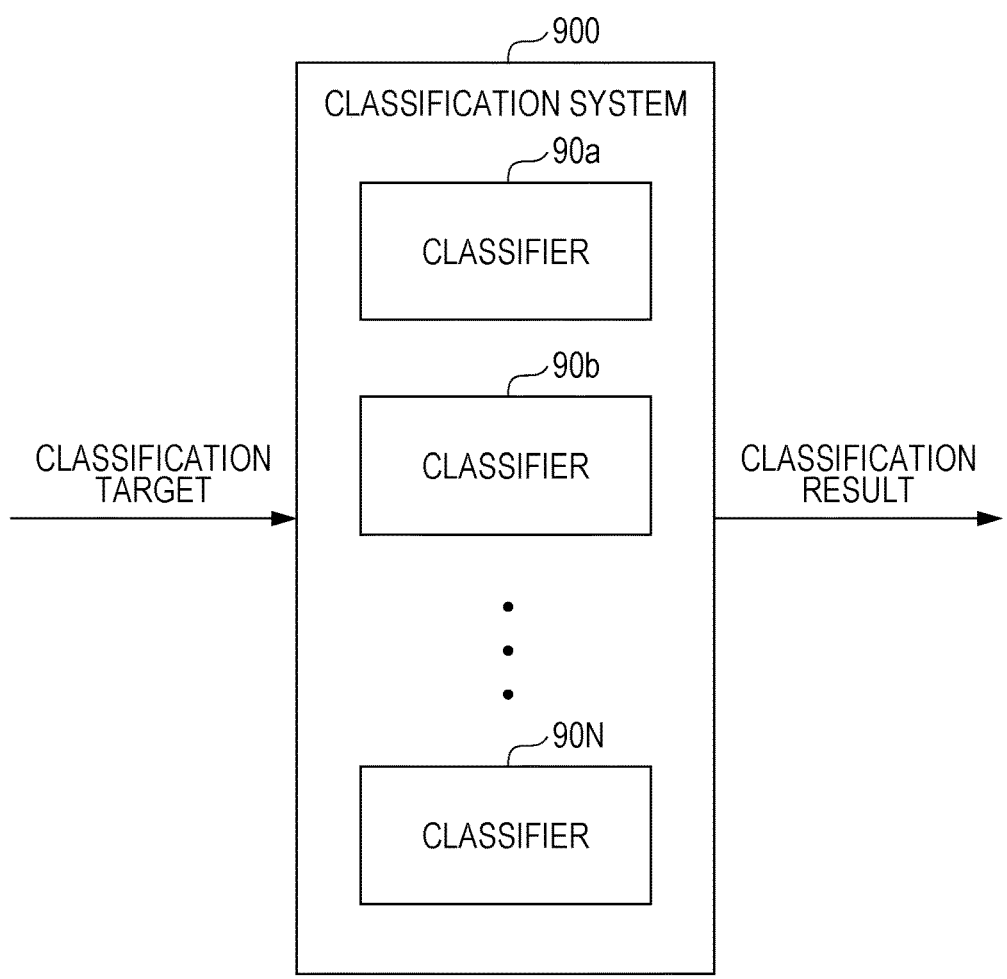
FIG. 9 is a diagram illustrating an example of a classification system according to a comparative example.

FIG. 9 is a diagram illustrating an example of a classification system 900 according to the comparative example.

The classification system 900 illustrated in FIG. 9 includes a plurality of classifiers (a classifier 90a, a classifier 90b, . . . , and a classifier 90N). Upon receipt of a classification target (an image to be subjected to recognition processing), the classification system 900 performs classification processing (recognition processing) by using the plurality of classifiers and outputs a result of the classification processing (classification result, recognition processing result).

The plurality of classifiers are convolutional neural network classifiers that are the same. Each of the plurality of classifiers includes 1 convolution filter (feature extraction filter) for convolution. Setting values (filter coefficients) of these filters are learned in advance in learning processing that will be described later.

Since the classifier 90a, the classifier 90b, . . . , and the classifier 90N that constitute the classification system 900 illustrated in FIG. 9 are the same, a configuration of the classifier 90a is described below as a representative.

Figure 10:
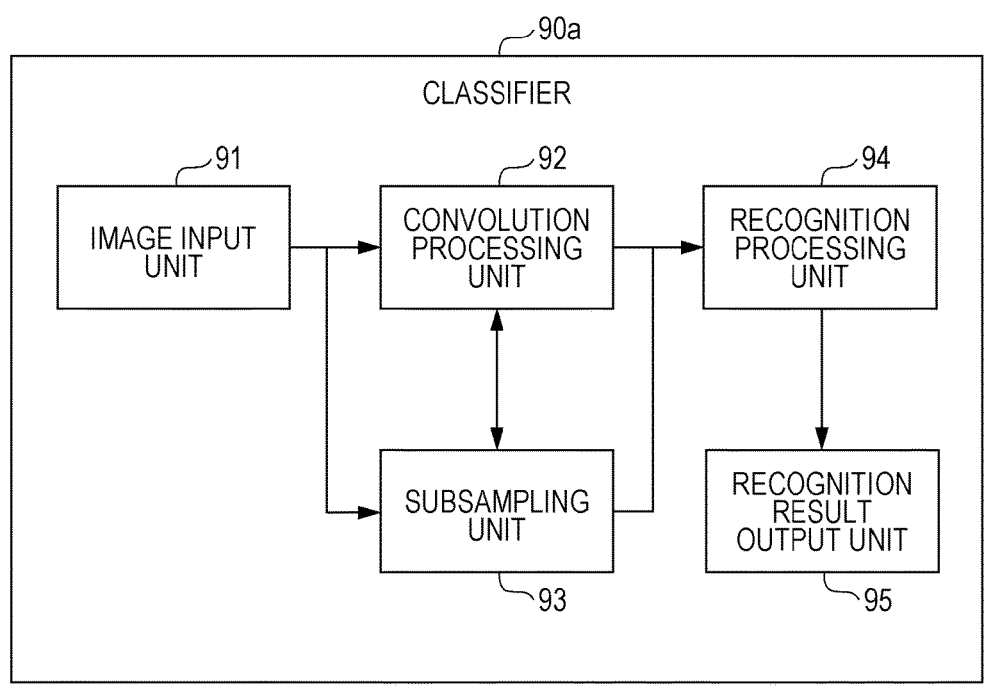
FIG. 10 is a block diagram illustrating a configuration of a classifier according to the comparative example.

FIG. 10 is a block diagram illustrating the configuration of the classifier 90a according to the comparative example.

As illustrated in FIG. 10, the classifier 90a includes an image input unit 91 that reads an image (input image), a convolution processing unit 92 that performs convolution processing on the input image, a subsampling unit 93 that performs subsampling processing, a recognition processing unit 94 that performs recognition processing, and a recognition result output unit 95 that outputs a recognition result. Note that the number of times of the convolution processing and the number of times of the subsampling processing are set to any values depending on the resolution of the input image, the type or complexity of a classification target (recognition processing target), the number of classifications (the number of recognition targets), or the like. For example, in a case where the classifier 90a detects a frontal human face in an image, the number of times of the convolution processing can be small, but in a case where, for example, dogs of a variety of types need be recognized, the number of times of the convolution processing need be larger than that in the case of a frontal human face.

Operation of Classification System 900

Next, recognition processing of the classification system 900 according to the classification example is described.

Recognition Processing

Figure 11:
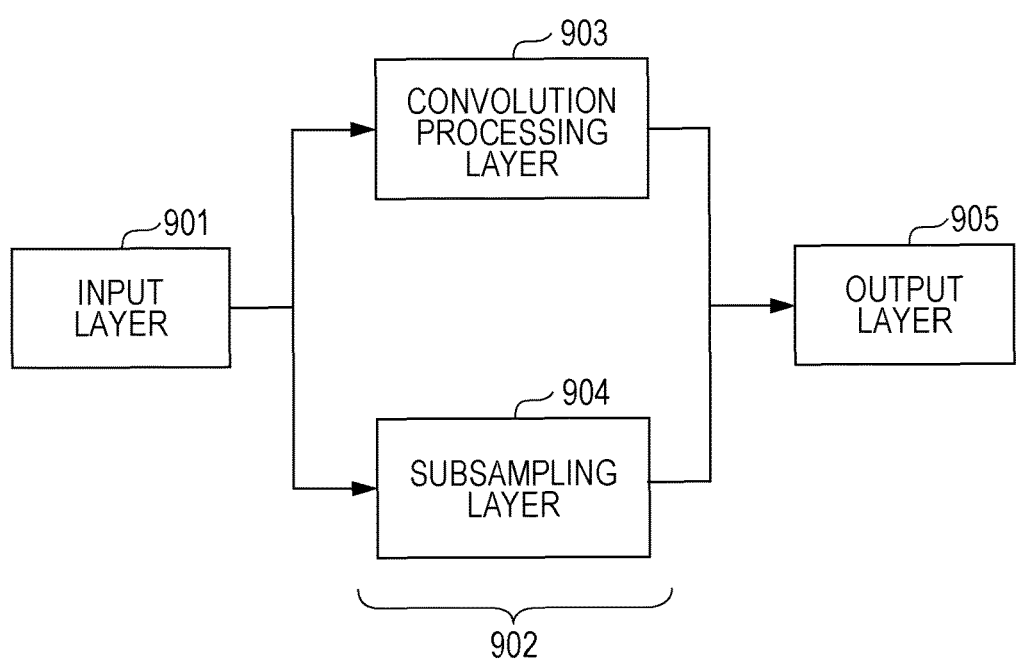
FIG. 11 is a diagram illustrating algorithm functional blocks for recognition processing in the classification system according to the comparative example.

FIG. 11 is a diagram illustrating algorithm functional blocks of the recognition processing in the classification system 900.

In image recognition performed by the classification system 900 by using the plurality of classifiers, recognition processing is performed by using an input layer 901, an intermediate layer 902 made up of a convolution processing layer 903 and a subsampling layer 904, and an output layer 905. A sequence of pixel values of an input image is input to the input layer 901. The number of intermediate layers 902 is not limited to 1 and may be more than 1. In the example illustrated in FIG. 11, only 1 intermediate layer 902 is described for simplification of description. Convolution processing is performed in the convolution processing layer 903, and subsampling processing is performed in the subsampling layer 904. In the intermediate layer 902, the subsampling processing is performed after the convolution processing in many cases. However, the convolution processing may be performed after the subsampling processing. The output layer 905 outputs a label of a recognition result. The label of the recognition result indicates a recognition target object, such as a dog or a cat, in the input image.

In the convolution processing layer 903, convolution processing is performed on a two-dimensional image. A filter coefficient of a convolution filter (feature extraction filter) used in the convolution processing is learned in advance in learning processing that will be described later. That is, a coefficient found in the learning processing by using a set of image and label whose correspondence is known (a learning image and a label) is used as the filter coefficient.

FIG. 12 is a flow chart for explaining recognition processing performed by the classification system 900.

Hereinafter, it is assumed that the classification system 900 includes N classifiers (the classifier 90a, the classifier 90b, . . . , and the classifier 90N).

First, the classification system 900 reads an input image (S91) and performs predetermined preprocessing on the input image (S92) in the input layer 901. The predetermined preprocessing is processing for uniforming a variation between input images, for example, subtracting an average of input images from the input image.

Next, the classification system 900 performs convolution processing in the convolution processing layer 903 (S93).

Specifically, the classification system 900 performs the convolution processing in the convolution processing layer 903 (S93) as follows. A convolution result (Conv (Img, F(n), i, j) in a pixel (i, j) can be calculated by using the following formula 1:

$$Conv(Img, F(n), i, j) = \sum_p \sum_{fh} \sum_{fw} Img(fw+i, fh+j, p) \times F(n)(fw, fh, p) \quad \text{formula 1}$$

where Img is the input image, and F(n) is a convolution filter of an n-th (n is any integer in a range from 1 to N) classifier 90n (the total number of convolution filters is N).

In the formula 1, i and j represent an i-th pixel and a j-th pixel of the input image, respectively, and p represents a color of a p-th pixel (for example, in the case of an RGB image, R in a case where p=0, G in a case where p=1, and B in a case where p=2). The classification system 900 can obtain a convolution processing result using F(n), which is the convolution filter of the n-th classifier 90n, by performing the convolution processing using the formula 1 on all pixels of Img while changing the values of i and j. That is, the classification system 900 can obtain a convolution processing result using the n-th classifier 90n.

Since the classification system 900 includes N classifiers (the classifier 90a, the classifier 90b, . . . , and the classifier 90N) as described above, the number of convolution filters is N. Accordingly, the classification system 900 performs convolution processing on 1 image (input image) by using N convolution filters and therefore obtains N convolution processing results.

Next, the classification system 900 performs subsampling processing in the subsampling layer 904 (S94). The subsampling processing is processing for performing, for each specific region (is, js), subsampling with respect to each of the N convolution processing results that are output by the convolution processing layer 903 by a predetermined standard sb. For example, in a case where a maximum value in a 2×2 region including a pixel (0, 0) is selected by subsampling, the maximum pixel value is selected as a representative value of four pixels in the 2×2 region.

Such a method of selecting a maximum value by subsampling is called Max-pooling. The sampling method is not limited to a maximum value and can use an average. A method of selecting an average by subsampling is called Average-pooling. By performing subsampling, (i) the amount of information can be reduced, and (ii) tolerance to position deviation in an xy direction of the input image can be improved in recognition.

After S94 (subsampling processing), the classification system 900 determines whether or not to finish the processing in the intermediate layer 902 in accordance with the number of times of the processing in S93 (convolution processing) and the number of times of the processing in S94 (subsampling processing), i.e., the number of times of processing in the intermediate layer 902 (S95). This is because, by repeating the processing in S93 and S94 predetermined times, features can be extracted from an input image by convolution processing, and features effective for identification of an object can be extracted by subsampling of the data (features).

In a case where it is determined in S95 that the processing in the intermediate layer 902 is not finished (No in S95), the classification system 900 returns to S93, in which the convolution processing in the convolution processing layer 903 is performed again. Then, in a case where the subsampling layer 904 exists after the convolution processing in the convolution processing layer 903, the subsampling processing is performed again.

Meanwhile, in a case where it is determined in S95 that the processing in the intermediate layer 902 is finished because the convolution processing and the subsampling processing have been performed predetermined times (Yes in S95), the classification system 900 performs recognition processing in the output layer 905 (S96) and supplies a result of the recognition processing (recognition result) to an outside (S97).

The following describes recognition processing (classification processing) for recognizing what an object in the input image is.

Recognition Processing

For example, the classification system 900 performs recognition processing for recognizing which of predetermined 10 types an object in the input image is. In this case, in the output layer 905, the classification system 900 supplies, to an outside, a result (recognition result) in which one of 10 variables (object labels) is 1 and the other variables are 0 in accordance with the input image.

Next, a specific output method in the output layer 905 in the recognition processing is described.

The output layer 905 outputs certainty of the label of the object in the input image by a Softmax method or a SVM method by using the features extracted (calculated) by the intermediate layer 902.

For example, the Softmax method is realized as follows. Specifically, in an example in which k objects are recognized, assume that vectors of k variables that are true values are Tr [0], Tr [1], . . . , Tr [k−1], and vectors of k outputs of the output layer are θ[0], θ[1], . . . , and θ[k−1]. In this case, a Softmax value of a label j can be calculated by the following formula 2. It can be determined which label a recognized object has on the basis of the calculated Softmax value.

$$\text{Softmax}(j) = \frac{e^{\theta T_j T_r(i)}}{\sum_{l=1}^{k} e^{\theta T_l T_r(i)}} \quad \text{formula 2}$$

In this way, the classification system 900 can perform recognition processing of an object in an input image by using a plurality of classifiers each including a convolution filter having a filter coefficient learned in advance in learning processing.

Learning Processing

Next, learning processing is described.

Filter coefficients of convolution filters of a plurality of classifiers used in recognition processing are learned in advance in learning processing using a large amount of learning data as described above.

A stochastic gradient decent method is known as a method for learning a filter coefficient.

First, a gradient decent method, which is a basic form of the stochastic gradient decent method, is described. It is assumed that a true value of output is given by a user in a learning image. In this case, in the gradient decent method, filter coefficients are modified in the order from a filter coefficient close to the output layer toward the front side on the basis of an error between the true value and an output value in recognition processing.

Meanwhile, in the stochastic gradient decent method, filter coefficients are modified by using an accumulated error obtained by performing recognition processing in some images instead of performing the filter coefficient modification processing for each image. In the case where filter coefficients are modified for each image, there is a possibility that the modified values fluctuate. However, the method of obtaining modified values by using results obtained from a plurality of images has an advantage of reducing unbalance and fluctuation in learning.

The formula 3 is a formula for modifying filter coefficients. In the formula 3, Loss is a function for obtaining an accumulated error, γ is a learning ratio, W is a vector of filter coefficients, the variable in is input, and the variable true is a true value. An error may be calculated by any method such as a method using a square error or a cross entropy error. Use of the formula 3 allows the filter coefficients to be updated by using differentiation of the error and the filter coefficients. Note that the learning ratio γ is weight that determines how much the error is updated one time and is determined by a user depending on a learning target.

$$W = W - \gamma \frac{d}{dW} \text{Loss}(F(W, \text{in}), \text{true})  \qquad \text{formula 3}$$

By repeating update of the filter coefficients through comparison between the input image and the true value, it is possible to calculate filter coefficients used to easily recognize the input image.

Filter coefficients with high generalization ability can be obtained by performing the learning by using a large amount of learning data.

The classification system 900 according to the comparative example, i.e., a conventional convolutional neural network performs recognition processing as described above, and filter coefficients of convolution filters used in the recognition processing are learned in advance.

Next, the image recognition method and the like according to the present embodiment are described.

Configuration of Classification System 1

Figure 2:
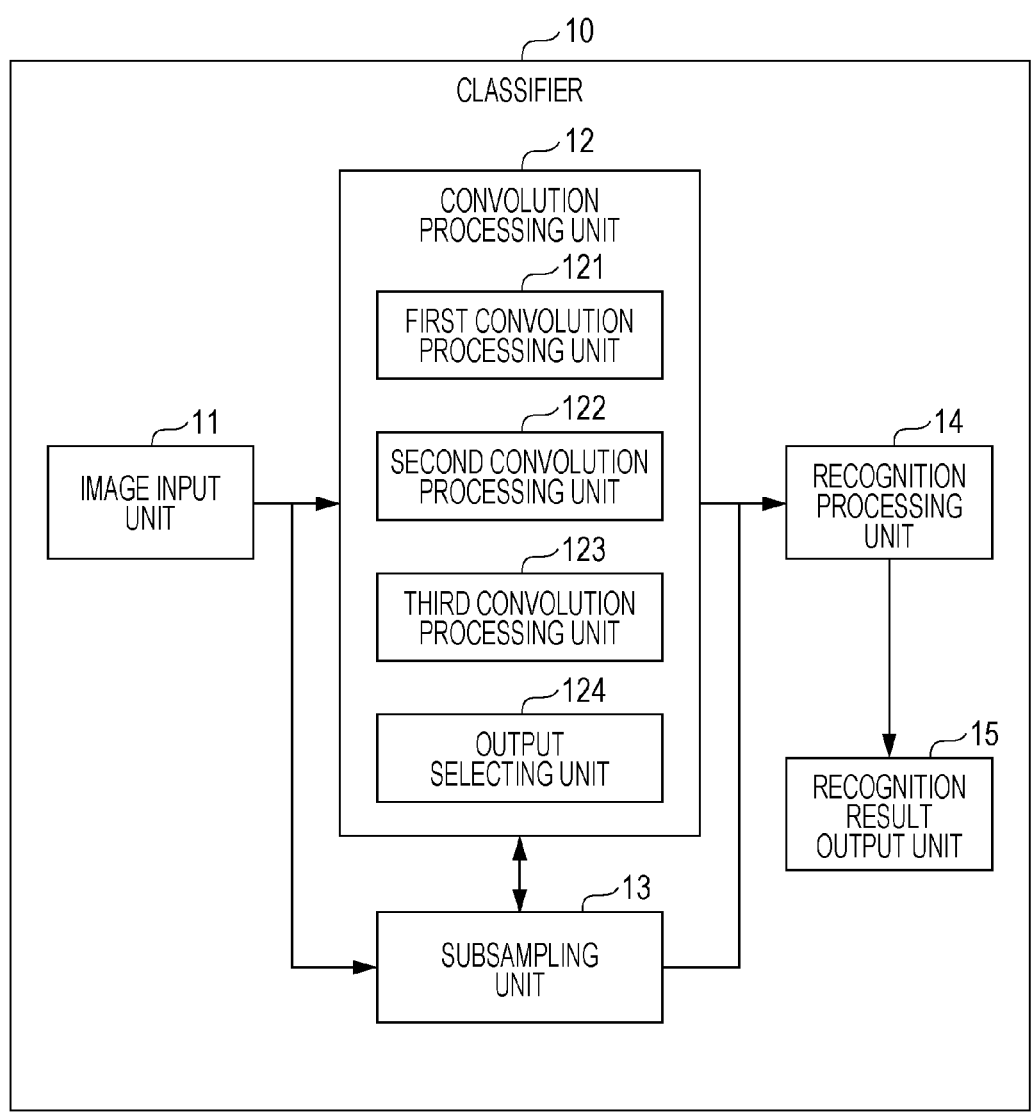
FIG. 2 is a block diagram illustrating an example of a configuration of a classifier according to the embodiment.

FIG. 1 is a block diagram illustrating an example of a configuration of a classification system 1 according to the present embodiment, FIG. 2 is a block diagram illustrating an example of a configuration of a classifier 10 according to the present embodiment.

The classification system 1 illustrated in FIG. 1 is a convolutional neural network that includes 1 classifier 10. Upon receipt of a classification target (an image to be subjected to recognition processing), the classification system 1 performs classification processing (recognition processing) by using the classifier 10 and outputs a result of the classification processing (classification result, recognition processing result).

Configuration of Classifier 10

The classifier 10 is an example of an image recognition device that performs recognition processing on an image and outputs a recognition result. As illustrated in FIG. 2, the classifier 10 includes an image input unit 11, a convolution processing unit 12, a subsampling unit 13, a recognition processing unit 14, and a recognition result output unit 15.

Note that the classifier 10 illustrated in FIG. 2 is markedly different from the classifier 90a and the like illustrated in FIG. 10 in terms of the configuration of the convolution processing unit 12.

The image input unit 11 receives an image. In the present embodiment, the image input unit 11 reads the received image (input image).

The convolution processing unit 12 performs convolution processing on the input image by using a plurality of different convolution filters. The convolution processing has been described above, and therefore detailed description thereof is omitted. The number of pieces of processing result information, which is information on a result of the convolution processing, at a position corresponding to each pixel included in the input image is equal to the number of convolution filters. Each of the pieces of processing result information includes, for example, a value of a result of the convolution processing at the position of each of a plurality of pixels included in the input image.

Note that since a value of the processing result included in the processing result information is associated with any of the positions of the plurality of pixels included in the input image, an element (processing result) included in the processing result information is also referred to as a pixel, the position of an element is also referred to as the position of a pixel, and a value of the processing result is also referred to as a pixel value.

For example, the convolution processing unit 12 determines 1 feature corresponding to the position of each of the plurality of pixels included in the input image on the basis of values of results of the convolution processing at the position of the pixel and outputs an output result information (also referred to as a selection result) including the determined feature at the position of the pixel.

Note that since the feature is associated with any of the positions of the plurality of pixels included in the input image, an element (feature) included in the output result information is also referred to as a pixel, the position of an element is also referred to as the position of a pixel, and a value of a feature is also referred to as a pixel value.

For example, the convolution processing unit 12 performs, for each of the positions of the plurality of pixels included in the input image, processing for selecting a processing result having a maximum value from among a plurality of values of processing results at the position of the pixel, determining the value of the selected processing result as a feature at the position of the pixel, and outputting the determined feature at the position of the pixel.

Alternatively, for example, the convolution processing unit 12 may perform, for each of the positions of a plurality of pixels included in the input image, processing for calculating a median or an average of a plurality of values of processing results at the position of pixel, determining the calculated value as a feature at the position of the pixel, and outputting the determined feature at the position of the pixel.

In this way, the convolution processing unit 12 determines 1 feature corresponding to each of the positions of the plurality of pixels included in the input image and outputs the determined feature corresponding to the position of the pixel.

In the present embodiment, the convolution processing unit 12 includes, for example, a first convolution processing unit 121, a second convolution processing unit 122, a third convolution processing unit 123, and an output selecting unit 124 as illustrated in FIG. 2.

The first convolution processing unit 121, the second convolution processing unit 122, and the third convolution processing unit 123 each have 1 convolution filter for performing convolution for each pixel of an input image. These convolution filters are different from each other.

That is, the convolution processing unit 12 has three different convolution filters and performs convolution processing on the input image by using the three different convolution filters. The three convolution filters differ from each other, for example, in resolution or scale parameter (filter size) or in color of a target to be processed.

Figure 3:
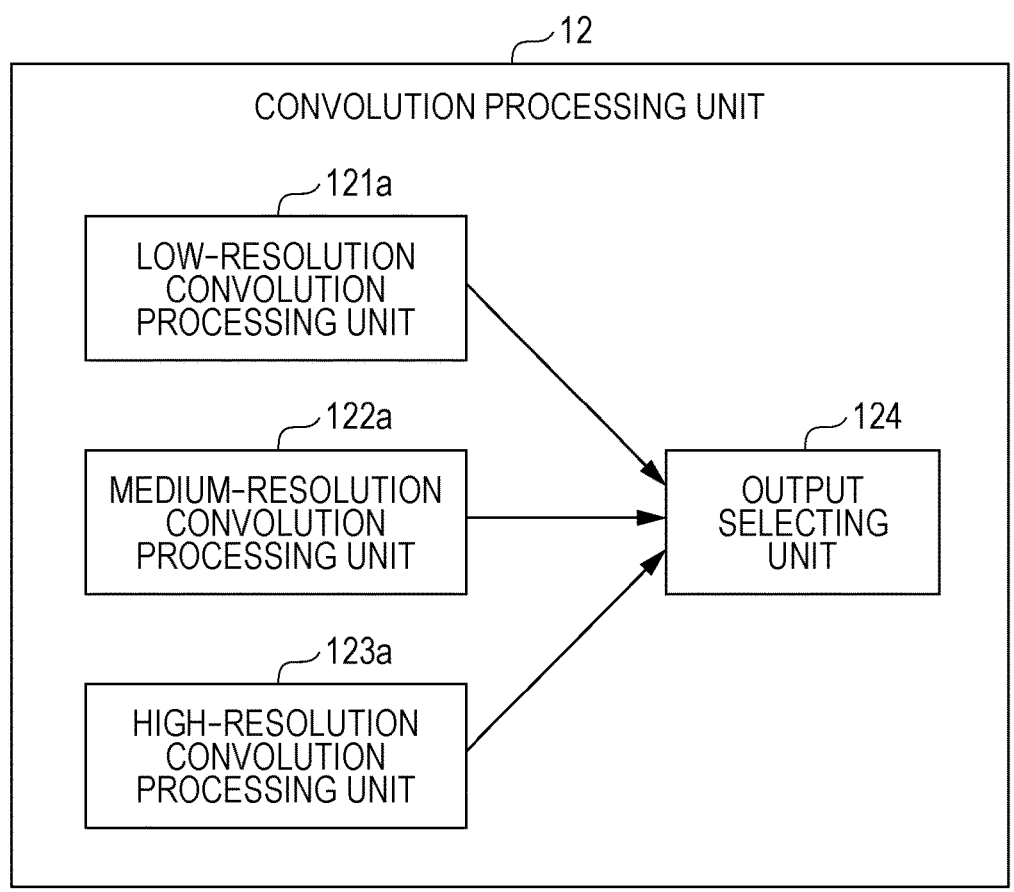
FIG. 3 is a block diagram illustrating an example of a configuration of a convolution processing unit according to the embodiment.

FIG. 3 is a block diagram illustrating an example of a configuration of the convolution processing unit 12 according to the present embodiment. In the example illustrated in FIG. 3, the convolution processing unit 12 includes a low-resolution convolution processing unit 121a as the first convolution processing unit 121, a medium-resolution convolution processing unit 122a as the second convolution processing unit 122, and a high-resolution convolution processing unit 123a as the third convolution processing unit 123.

The low-resolution convolution processing unit 121a is a processing unit that performs convolution processing on an input image by using a convolution filter having the lowest resolution (low-resolution) corresponding to first resolution among the three convolution filters of the convolution processing unit 12. The medium-resolution convolution processing unit 122a is a processing unit that performs convolution processing on an input image by using a convolution filter having resolution (medium-resolution) that is not the lowest nor highest and that corresponds to second resolution higher than the first resolution among the three convolution filters of the convolution processing unit 12. The high-resolution convolution processing unit 123a is a processing unit that performs convolution processing on an input image by using a convolution filter having the highest resolution (high-resolution) corresponding to third resolution higher than the second resolution among the three convolution filters of the convolution processing unit 12.

In the present embodiment, an example in which three convolution filters having different levels of resolution are used is described. Note, however, that the number of convolution filters having different levels of resolution is not limited to 3.

For example, the number of convolution filters having different levels of resolution may be 2 or may be 4 or more. That is, the number of convolution filters having different levels of resolution is at least 2.

The output selecting unit 124 obtains three pieces of processing result information as a result of the convolution processing performed on an input image by the first convolution processing unit 121, the second convolution processing unit 122, and the third convolution processing unit 123.

Each of the three pieces of processing result information includes values of processing results of the convolution processing that correspond to the positions of a plurality of pixels included in the input image.

For example, the output selecting unit 124 determines 1 feature at each of the positions of the plurality of pixels on the basis of the values of the processing results of the convolution processing that are included in the three pieces of processing result information, and then outputs an output result information including the determined feature at each position.

For example, the output selecting unit 124 performs, for each of the positions of the plurality of pixels included in the input image, processing for selecting a processing result having a maximum value among values of a plurality of processing results at the position of the pixel, determining the value of the selected processing result as a feature at the position of the pixel, and then outputting the determined feature at the position of the pixel.

Alternatively, for example, the output selecting unit 124 may perform, for each of the positions of the plurality of pixels included in the input image, processing for calculating a median or an average of values of a plurality of processing results at the position of the pixel, determining the calculated value as a feature at the position of the pixel, and outputting the determined feature at the position of the pixel.

In this way, the output selecting unit 124 determines 1 feature at each of the positions of the plurality of pixels included in the input image and outputs the determined feature at each of the positions of the plurality of pixels.

In the example illustrated in FIGS. 9 through 11, all of values of processing results included in three pieces of processing result information are output. Meanwhile, the present embodiment is markedly different in that the convolution processing unit 12, more specifically the output selecting unit 124 that outputs 1 feature for each of the positions of the plurality of pixels is provided.

The following describes an example in which the output selecting unit 124 selects a maximum value from among values (i.e., a plurality of pixel values) of three processing results of the convolution processing performed on each of the plurality of pixels that constitute the input image by the low-resolution convolution processing unit 121a, the medium-resolution convolution processing unit 122a, and the high-resolution convolution processing unit 123a illustrated in FIG. 3.

Figure 4:
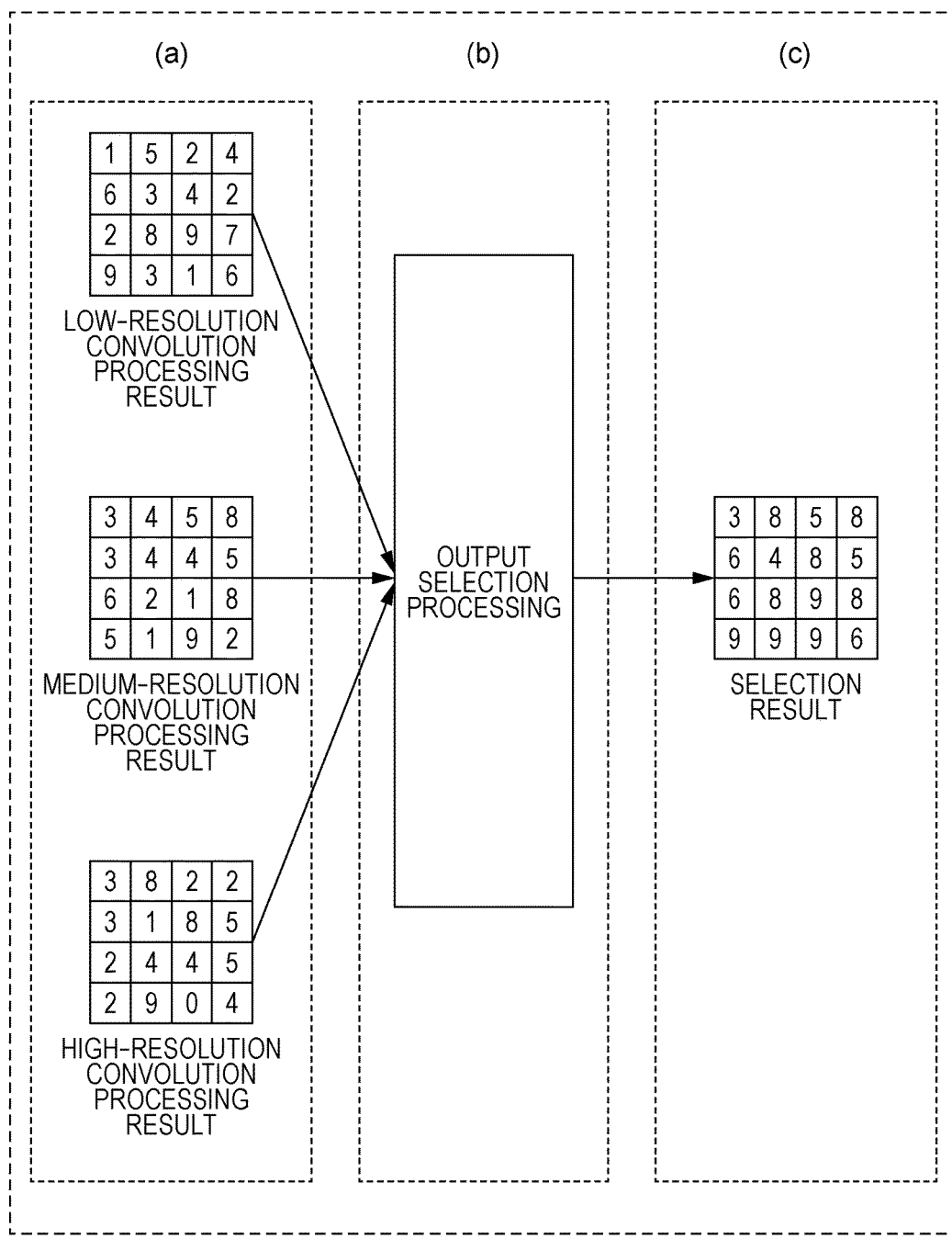
FIG. 4 is a diagram illustrating an example of processing results of the convolution processing unit according to the embodiment.

FIG. 4 is a diagram illustrating an example of processing results of the convolution processing unit 12 according to the present embodiment.

The low-resolution convolution processing unit 121a, the medium-resolution convolution processing unit 122a, and the high-resolution convolution processing unit 123a perform convolution processing on the same input image.

The upper portion of FIG. 4(a) illustrates an example of values of processing results (low-resolution convolution processing results) of convolution processing performed on an 4×4 input image by using a low-resolution convolution filter by the low-resolution convolution processing unit 121a. As illustrated in the upper portion of FIG. 4(a), a value of a processing result of the low-resolution convolution processing is illustrated in each of the 4×4 pixels included in the input image. In the present embodiment, the number of pixels included in the input image is 4×4=16, and 16 values of processing results are illustrated accordingly. The values of the processing results are illustrated at positions corresponding to the pixels included in the input image.

The middle portion of FIG. 4(a) illustrates an example of values of processing results (medium-resolution convolution processing results) of convolution processing performed on an 4×4 input image by using a medium-resolution convolution filter by the medium-resolution convolution processing unit 122a. As illustrated in the middle portion of FIG. 4(a), a value of a processing result of the medium-resolution convolution processing is illustrated in each of the 4×4 pixels included in the input image. In the present embodiment, the number of pixels included in the input image is 4×4=16, and 16 values of processing results are illustrated accordingly. The values of the processing results are illustrated at positions corresponding to the pixels included in the input image.

The lower portion of FIG. 4(a) illustrates an example of values of processing results (high-resolution convolution processing results) of convolution processing performed on an 4×4 input image by using a high-resolution convolution filter by the high-resolution convolution processing unit 123a. As illustrated in the lower portion of FIG. 4(a), a value of a processing result of the high-resolution convolution processing is illustrated in each of the 4×4 pixels included in the input image. In the present embodiment, the number of pixels included in the input image is 4×4=16, and 16 values of processing results are illustrated accordingly. The values of the processing results are illustrated at positions corresponding to the pixels included in the input image.

In this case, output selection processing in which the output selecting unit 124 selects a maximum pixel value is performed (see FIG. 4(b)).

In the following description, values at the upper left corner that are included in the processing result information of the low-resolution convolution processing in FIG. 4(a) (the low-resolution convolution processing result illustrated in FIG. 4(a)), processing result information of the medium-resolution convolution processing (the medium-resolution convolution processing result illustrated in FIG. 4(a)), and the processing result information of the high-resolution convolution processing (the high-resolution convolution processing result illustrated in FIG. 4(a)) are taken as an example.

These values are values of processing results of the low-resolution convolution processing, the medium-resolution convolution processing, and the high-resolution convolution processing performed on a pixel located at the upper left corner of the input image. These values of the processing results are "1" and "3".

The output selecting unit 124 selects a processing result having a maximum value from among these values of the processing results and then determines the selected value of the processing result ("3" in this example) as a feature corresponding to the pixel located at the upper left corner.

The output selecting unit 124 outputs "3" as the feature corresponding to the pixel located at the upper left corner.

Note that in a case where there are two or more maximum values, the output selecting unit 124 need just select any one of the two or more maximum values of the processing results.

The output selecting unit 124 outputs output result information (selection results illustrated in FIG. 4(c)) by performing similar processing on other pixels included in the input image.

The selection results illustrated in FIG. 4(c) are, for example, values of selection results corresponding to the positions of the pixels included in the input image, like the processing results of the convolution processing. In the example illustrated in FIG. 4, the number of pixels included in the input image is 4×4=16, and 16 values corresponding to the positions of the pixels are output as the selection results accordingly.

The values included in the selection results illustrated in FIG. 4(c) include maximum values (pixel values) among values of the low-resolution convolution processing results, the medium-resolution convolution processing results, and the high-resolution convolution processing results at the positions corresponding to the pixels included in the input image.

As described above, since the convolution processing unit 12 includes the low-resolution convolution processing unit 121a, the medium-resolution convolution processing unit 122a, the high-resolution convolution processing unit 123a, and the output selecting unit 124, output result information (or referred to as selection results) including, as features of the pixels included in the input image, only values of processing results whose correlation between the input image and the processing result is the highest (i.e., maximum pixel values) can be supplied to the output side (the recognition processing unit 14). That is, all of the values included in each processing result are not supplied to the output side (the recognition processing unit 14). This makes it possible to reduce the number of parameters of the classifier 10, thereby reducing the amount of memory used by the whole classification system 1.

Furthermore, the convolution processing unit 12 produces an effect of being capable of efficiently extracting features from objects in an input image by using a plurality of convolution filters having different levels of resolution in parallel even in a case where the objects in the input image are different in size and resolution.

The subsampling unit 13 performs subsampling processing for determining a representative feature from among a plurality of features included in the selection results output by the convolution processing unit 12 (more specifically, the output selecting unit 124).

Since each of the plurality of features included in the selection results is associated with any of the positions of the plurality of pixels included in the input image, a feature included in the selection results may be referred to as a pixel value, a representative feature may be referred to as a representative pixel value, and the position of a feature (i.e., the position of a pixel corresponding to a feature in the input image) may be referred to as the position of a pixel.

For example, the subsampling unit 13 determines in advance a region of a size including a plurality of adjacent pixels among the plurality of pixels included in the input image or the selection results, divides the plurality of features included in the selection results into regions of the aforementioned size, and determines a representative feature for each of the divided regions.

For example, the subsampling unit 13 divides the selection results and determines, as a representative feature, a feature of the largest value among features at positions of a plurality of pixels included in each divided region. This is because the feature of the largest value indicates a result whose correlation between a region of the input image that corresponds to the aforementioned region and a processing result is highest. Therefore, the subsampling unit 13 determines, for each divided region, a feature having a maximum value among features included in the region as a representative feature in the region.

In the present embodiment, the subsampling unit 13 performs subsampling processing on the output results of the convolution processing unit 12 for each specific region (is, is) on a predetermined standard sb. For example, in a case where a maximum value in a 2×2 region including a pixel (0, 0) is selected by subsampling, a feature (pixel value) having a maximum value is selected as a representative value of four pixels in the 2×2 region.

The following describes an example in which the subsampling unit 13 determines a representative feature by using the selection results illustrated in FIG. 4(c).

Figure 5:
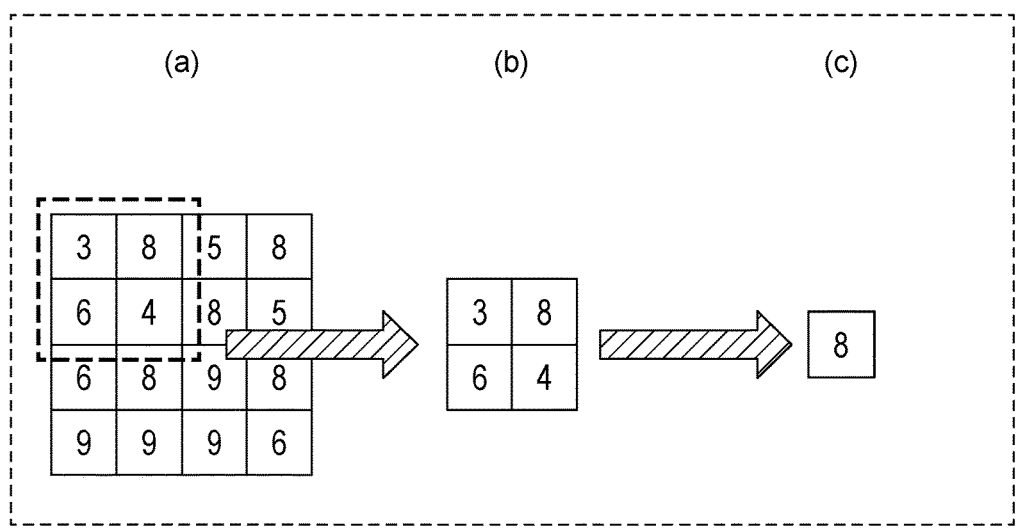
FIG. 5 is a diagram illustrating an example of subsampling in a subsampling unit according to the present embodiment.

FIG. 5 is a diagram illustrating an example of the subsampling processing of the subsampling unit 13 according to the present embodiment. FIG. 5 illustrates an example of a result of subsampling processing for selecting a maximum pixel value in a 2×2 region including a pixel (0, 0) in the subsampling unit 13. FIG. 5(*a*) illustrates the selection results illustrated in FIG. 4(*c*). Assume that an upper left in the image in which a maximum pixel value is selected for each pixel as a selection result is the origin (0, 0), the subsampling unit 13 samples a 2×2 region (4 pixels) and thereby obtains pixel values 3, 8, 6, and 4 corresponding to the respective pixels as illustrated in FIG. 5(*b*). Then, the subsampling unit 13 selects 8 as a representative feature of the region including the 4 pixels by sampling a maximum value (maximum pixel value) among the plurality of pixel values obtained by the sampling. Furthermore, for example, the subsampling unit 13 performs similar processing on other regions. For example, the subsampling unit 13 selects 8, 9, and 9 as representative features by sampling a 2×2 region including an upper right pixel, a 2×2 region including a lower left pixel, and a 2×2 region including a lower right pixel among the selection results illustrated in FIG. 5(*a*).

Note that by repeating the convolution processing in the convolution processing unit 12 and the subsampling processing in the subsampling unit 13 predetermined times, features can be extracted from an input image by the convolution processing, and subsampling of the data (features) can be performed, and it is therefore possible to extract features effective for identifying an object.

Note that an example in which the convolution processing in the convolution processing unit 12 and the subsampling processing in the subsampling unit 13 are repeated predetermined times has been described, but the present embodiment is not limited to this.

For example, selection results obtained by performing the convolution processing on an input image in the convolution processing unit 12 may be supplied to the recognition processing unit 14.

The recognition processing unit 14 performs recognition processing on the basis of the output result output by the convolution processing unit 12. For example, the recognition processing unit 14 performs recognition processing on the basis of the representative features determined by the subsampling unit 13. Note that a specific method of the recognition processing is the same as that described in the comparative example, and therefore description thereof is omitted.

The recognition result output unit 15 outputs a recognition processing result obtained by the recognition processing performed by the recognition processing unit 14.
Operation of Classifier 10

Next, operation of the classifier 10 configured as above is described.

Figure 6:
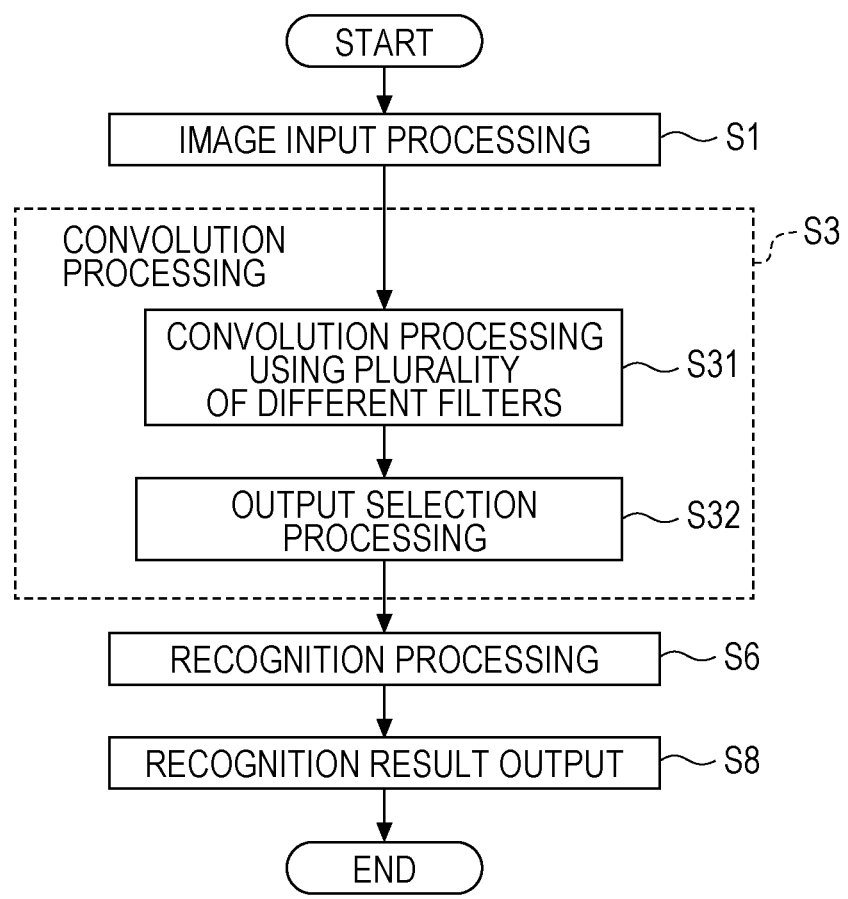
FIG. 6 is a flow chart for explaining operation of the classifier according to the embodiment.

FIG. 6 is a flow chart for explaining operation of the classifier 10 according to the present embodiment. FIG. 7 is a flow chart illustrating details of the operation illustrated in FIG. 6.

First, the classifier 10 performs image input processing for receiving an image (S1). More specifically, the classifier 10 reads an image (input image) (S11) and performs predetermined preprocessing on the input image (S12) as illustrated in FIG. 7.

Next, the classifier 10 performs convolution processing (S3). Specifically, in S3, the classifier 10 performs convolution processing using a plurality of different convolution filters on the input image (S31) and determines 1 feature for each of the positions of a plurality of pixels that constitute the image on the basis of a plurality of processing results at the position that are obtained by the convolution processing (S32).

More specifically, in S31, the classifier 10 performs, for example, convolution processing on the input image by using the low-resolution convolution filter in the low-resolution convolution processing unit 121*a* as illustrated in FIG. 7 (S311). Furthermore, in S31, the classifier 10 performs convolution processing on the input image by using the medium-resolution convolution filter in the medium-resolution convolution processing unit 122*a* (S312), and the classifier 10 performs convolution processing on the input image by using the high-resolution convolution filter in the high-resolution convolution processing unit 123*a* (S313). In this way, the classifier 10 can obtain values of processing results of convolution processing performed on positions of the pixels included in the input image at various levels of resolution. Note that the order of S311 through S313 in S31 is not limited to the one illustrated in FIG. 7. The order is not limited as long as the processes in S311 through S313 are performed in S31. Next, in S32, the classifier 10 performs output selection processing for comparing values of processing results of the convolution processing in S31 using convolution filter of respective levels of resolution at each of the positions of the pixels included in the input image and then outputting a maximum value as a feature at each position as illustrated in FIG. 7. The classifier 10 performs subsampling processing on these features that are supplied to a subsequent subsampling layer (S4). Then, the convolution processing (S3) and the subsampling processing (S4) are repeatedly performed by using processing results of the subsampling processing (S4) as new input. It is determined whether or not to finish the convolution processing (S3) in accordance with whether or not the number of repetitions of the convolution processing (S3) and the subsampling processing (S4) is larger than a threshold value (S5). The classifier 10 returns to S3 in a case where it is determined in S5 that the convolution processing (S3) is not finished (No in S5). The classifier 10 proceeds to S6 in a case where it is determined in S5 that the convolution processing (S3) is finished (Yes in S5).

Note that, for example, the recognition processing (S6) that will be described later may be performed after the subsampling processing (S4) without repeatedly performing the convolution processing (S3) and the subsampling processing (S4). In this case, for example, the threshold value in S5 need just be set to 1.

The following describes a case where the classifier 10 performs the convolution processing (S3) plural times (in plural convolution processing layers).

Figure 8B:
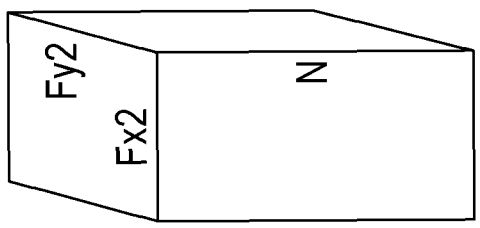
FIG. 8B is a diagram for explaining convolution processing in the second and subsequent layers.
Figure 8A:
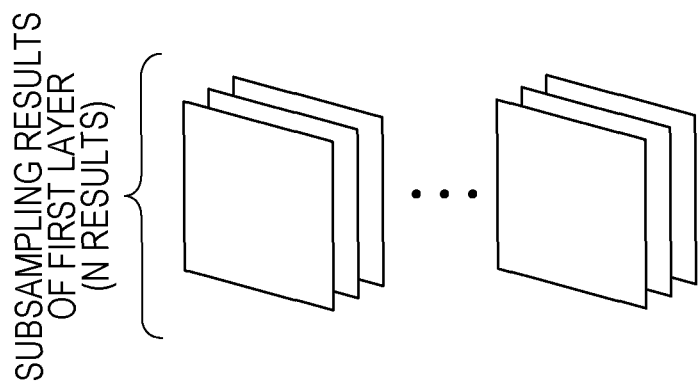
FIG. 8A is a diagram for explaining convolution processing in the second and subsequent layers.

FIGS. 8A and 8B are diagrams for explaining convolution processing in the second and subsequent layers. FIG. 8A illustrates N outputs of the first layer (the subsampling layer), and FIG. 8B is a conceptual diagram illustrating convolution filters of the second layer (convolution filters).

In the second convolution processing layer, three-dimensional convolution processing is performed by using the N outputs of the first layer (the subsampling layer) illustrated in FIG. 8A and the convolution filters of the second layer illustrated in FIG. 8B. The height of the convolution filters of the second layer is N, which is the same as the number of filters that are output in the first layer, assume that the depth and the width of the convolution filters are Fy2 and Fx2, respectively. The convolution processing is performed as many times as the number of filters of the second layer. Then, in a case where there is a subsampling layer after the convolution processing layer, subsampling processing is performed in a manner similar to that in the first layer.

By repeating the above processing predetermined times, features can be extracted from an input image by convolution processing, and subsampling processing of the data (features) can be performed, and it is thereby possible to extract features effective for identifying an object.

See FIGS. 6 and 7 again. In a case where it is determined in S5 that the convolution processing (S3) is finished (Yes in S5), the classifier 10 performs recognition processing (S6). More specifically, the classifier 10 performs recognition processing on the basis of pixel values of a plurality of pixels selected in the convolution processing in S3.

Next, the classifier 10 outputs a result of the recognition processing in S6 (recognition result information) (S8). More specifically, the classifier 10 outputs a processing result obtained by performing the recognition processing in S6 (recognition processing result information).

Effects Etc.

According to the present embodiment, information useful for recognition can be selectively used at each of positions of a plurality of pixels included in an input image among values of a plurality of processing results that are calculated by performing convolution processing in parallel by using different convolution filters. This allows not only high-speed image recognition but also an improvement in precision of the image recognition, thereby achieving an image recognition method and an image recognition device that enables high-speed and high-precision image recognition.

Furthermore, since the classification system 1 according to the present embodiment that realizes an image recognition device need just have 1 classifier 10 having different convolution filters, the structure of a neural network can be made simple, and processing speed can be improved.

Furthermore, in the image recognition device and the like according to the present embodiment, a plurality of convolution filters having different levels of resolution are used in parallel. This makes it possible to efficiently extract features from objects in an input image even in a case where the objects in the input image are different in size and resolution. In other words, since a plurality of levels of resolution can be handled in the first layer (the first intermediate layer) of the classifier 10, various levels of resolution from low-resolution to high-resolution can be handled even in a case where resolution in an input image is unknown. It is therefore possible to extract features more suitable for recognition.

For example, in text recognition or the like, features can be extracted from a straight line by using a low-resolution convolution filter that allows a certain level of error, and features can be extracted from a curved line by using a high-resolution convolution filter that can express a curved state. For example, a low-resolution convolution filter can be used in a case where recognition capability is susceptible to position deviation, and a high-resolution convolution filter can be used in a case where recognition capability is not susceptible to position deviation. This makes it possible to automatically select resolution in accordance with the properties of an image.

In the present embodiment, an example in which three different convolution filters, i.e., a low-resolution convolution filter, a medium-resolution convolution filter, and a high-resolution convolution filter are used as the different convolution filters of the convolution processing unit 12 has been described. However, the present embodiment is not limited to this. The number of convolution filters and the resolution of the convolution filters are not limited to those described above, and the number of convolution filters may be smaller depending on a recognition target. In this case, it is possible to further reduce the memory amount and calculation amount. Furthermore, the resolution of the convolution filters can be determined in accordance with resolution of a characteristic part (e.g., edge) of a recognition target image (input image) if the resolution of the characteristic part is known.

In the present embodiment, an example in which a plurality of convolution filters are different in resolution or scale parameter has been described. However, the present embodiment is not limited to this. For example, the plurality of convolution filters may be different in color to be processed. More specifically, in the present embodiment, an example in which the first convolution processing unit 121, the second convolution processing unit 122, and the third convolution processing unit 123 perform convolution processing on an input image by using a plurality of filters that are different in resolution and scale parameter has been described, but the present embodiment is not limited to this. For example, the first convolution processing unit 121, the second convolution processing unit 122, and the third convolution processing unit 123 may perform convolution processing on an input image by using a plurality of convolution filters that are different in color to be processed. Results of processing in the plurality of convolution filters may be subjected to selection processing in the output selecting unit 124. This allows the classifier 10 according to the present embodiment to obtain features effective for input images that are more characteristic in variation and distribution of colors than in contour of luminance.

Each processing in the classifier 10 has been described above in the embodiment, but an entity or a device that performs the processing is not limited to a specific one. For example, the processing may be performed by a processor or the like (described below) incorporated into a specific device that is locally disposed. The processing may be performed by a server or the like disposed at a place different from the local device. The processing described in the present disclosure may be shared by the local device and the server by information sharing between the local device and the server. For example, the local device may include the image input unit 11 and the recognition result output unit 15 that are parts of the classifier 10, and the server may include the convolution processing unit 12, the subsampling unit 13, and the recognition processing unit 14 that are other parts of the classifier 10.

In a case where part or all of the processing of the classifier 10 is realized by the server in the embodiment, the processing can be realized by a cloud service of the following types. However, the types of cloud service that realizes the processing described in the embodiment are not limited to these.

The following describes a service provided by the server that realizes part or all of the processing of the classifier 10.

FIGS. 13A through 13C are diagrams for explaining an example of a mode in which a service is provided by using a server.

In FIG. 13A, a server (1100) includes a cloud server (110011) run by a data center management company (11001) and a server (110021) run by a service provider.

The cloud server (110011) is a virtual server that works with various apparatuses over the Internet. The cloud server (110011) mainly manages enormous data (big data) and the like that are difficult to handle with the use of a general database management tool or the like. The data center management company (11001), for example, manages data, manages the cloud server (110011), and runs a data center that manages data and manages the cloud server (110011). Details of service provided by the data center management company (11001) will be described later. The data center management company (11001) is not limited to a company that, for example, only manages data and runs the cloud server (110011).

In a case where a manufacturer that develops and manufactures the classifier 10 and the classification system 1 described in the above embodiment is also in charge of management of data, operation of the cloud server (110011), and the like, the manufacturer is the data center management company (11001) (FIG. 13B).

The number of data center management companies (11001) is not limited to 1. For example, in a case where a manufacturer and another management company are jointly or separately in charge of management of data and operation of the cloud server (110011), both of or any one of the manufacturer and the other management company are(is) the data center management company (11001) (FIG. 13C).

The service provider (11002) has a server (110021). The scale of the server (110021) is not limited, and examples thereof include a personal computer and a server that operates in a gateway machine. The service provider may have no server (110021).

Next, flow of information in the service is described.

For example, an image taken by a home appliance such as a digital camera at a house A (1210) illustrated in FIG. 13A is transmitted to the cloud server (110011) (the arrow (a) in FIG. 13A).

The cloud server (110011) receives, for example, an image that is taken by a home appliance from the house A (1210) or another home B and then stores therein the received image.

Next, the cloud server (110011) of the data center management company (11001) provides information such as the stored image to the service provider (11002) by a constant unit. The unit may be one that allows the information such as the image stored in the data center management company to be provided to the service provider (11002) in an organized manner or may be one requested by the service provider (11002). Although the expression "constant unit" is used, the unit need not be constant, and the amount of provided information may vary depending on the situation.

The information such as the image provided from the data center management company (11001) to the service provider (11002) is stored in the server (110021) of the service provider (11002) according to need (the arrow (b) in FIG. 13A).

Then, the service provider (11002) provides a user with information compatible with a service provided to the user (e.g., resolution (setting values that should be set in a plurality of different convolution filters) learned on the basis of information on results of processing in the convolution processing unit 12 and the subsampling unit 13 that are parts of the classifier 10 and the information such as the provided image) on the basis of the image and the like.

The user may be a user (1211) who uses one or more home appliances or may be a user (1212) outside a house.

The service may be, for example, provided to the user directly from the service provider (11002) without passing through the cloud server (110011) again (the arrow (e) or (f) in FIG. 13A).

Alternatively, the service may be, for example, provided to the user via the cloud server (110011) of the data center management company (11001) (the arrow (c) or (d) in FIG. 13A). The cloud server (110011) of the data center management company (11001) may provide the service provider (11002) with information that is compatible with a service provided to the user (in a case where the cloud server (110011) includes, for example, the convolution processing unit 12 and the subsampling unit 13 that are parts of the classifier 10, resolution (setting values that should be set in a plurality of different convolution filters) learned on the basis of information on results of processing in the parts and the information such as the provided image) on the basis of an image taken by a home appliance and the like.

The types of service are described below.

Service Type 1: In-House Data Center Type

Figure 14:
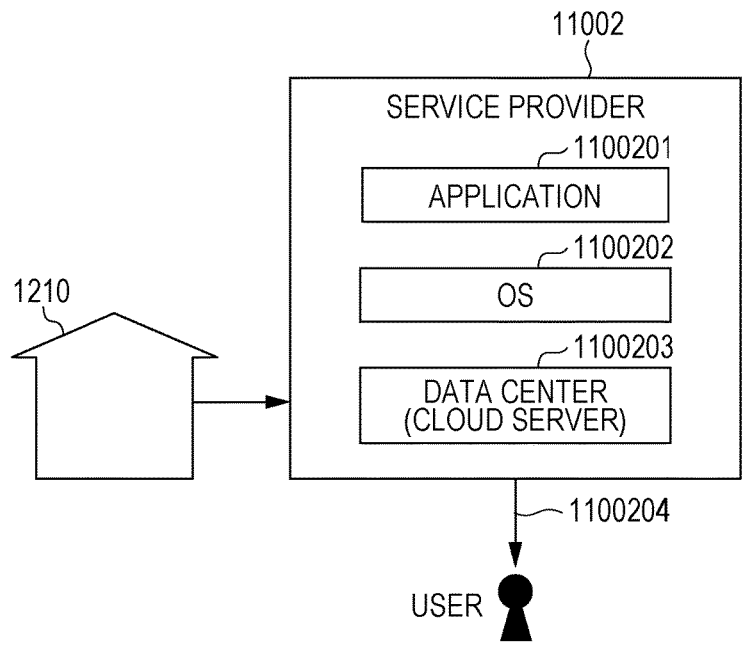
FIG. 14 is a diagram for explaining an example of a service type.

FIG. 14 is a diagram for explaining an example of a service type.

Specifically, FIG. 14 illustrates Service Type 1 (In-House Data Center Type). In this type, the service provider (11002) acquires information such as an image from the house A (1210) illustrated in FIG. 14 and provides information compatible with a service to a user.

In this type, the service provider (11002) has a function of a data center management company. That is, the service provider has the cloud server (110011) that manages big data. Accordingly, there is no data center management company.

In this type, the service provider (11002) runs and manages a data center (the cloud server (110011)) (1100203). Furthermore, the service provider (11002) manages an OS (1100202) and an application (1100201). The service provider (11002), for example, performs processing corresponding to the convolution processing unit 12 and the subsampling unit 13 that are parts of the classifier 10 and provides the information compatible with the service to the user (1100204) by using the OS (1100202) and the application (1100201) managed in the service provider (11002).

Service Type 2: IaaS Type

Figure 15:
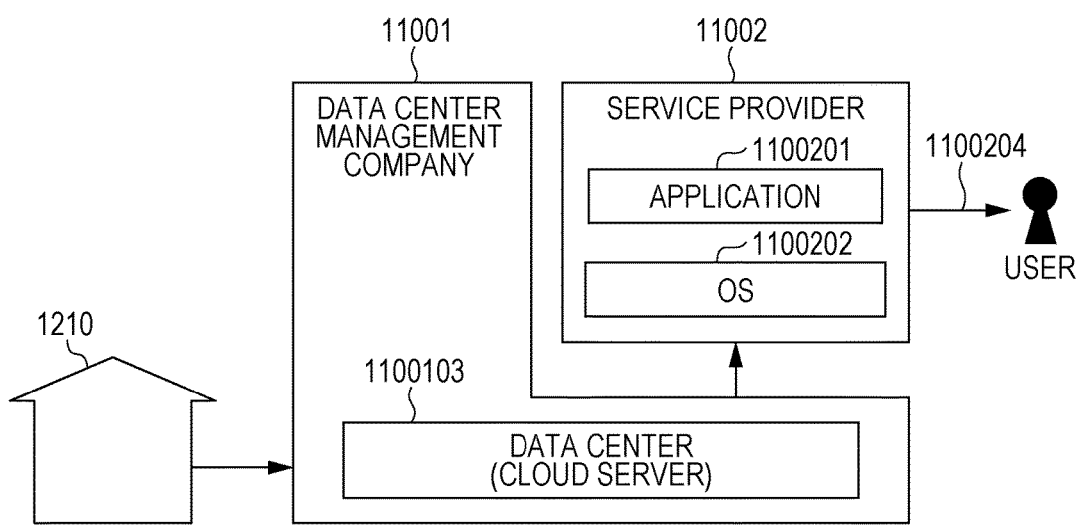
FIG. 15 is a diagram for explaining an example of a service type.

FIG. 15 is a diagram for explaining an example of a service type.

Specifically, FIG. 15 illustrates Service Type 2 (IaaS Type).

IaaS is an abbreviation of Infrastructure as a Service and is a cloud service providing model that provides an infrastructure itself for construction and operation of a computer system as a service via the Internet.

In this type, a data center management company runs and manages a data center (the cloud server (110011)) (1100103). Furthermore, the service provider (11002) manages an OS (1100202) and an application (1100201). The service provider (11002), for example, performs processing corresponding to the convolution processing unit 12 and the subsampling unit 13 that are parts of the classifier 10 and provides the information compatible with the service to the user (1100204) by using the OS (1100202) and the application (1100201) managed in the service provider (11002).

Service Type 3: PaaS Type

Figure 16:
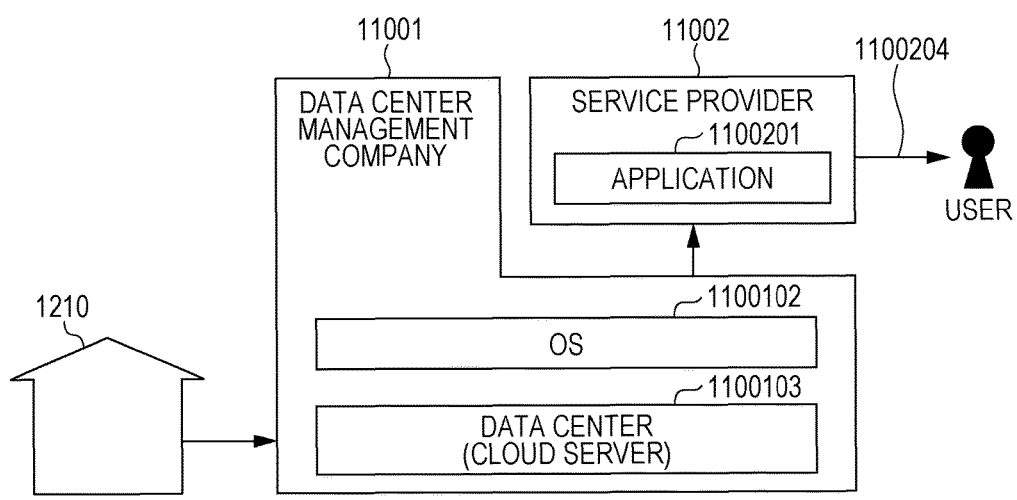
FIG. 16 is a diagram for explaining an example of a service type.

FIG. 16 is a diagram for explaining an example of a service type.

Specifically, FIG. 16 illustrates Service Type 3 (PaaS Type). PaaS is an abbreviation of Platform as a Service and is a cloud service providing model that provides a platform for construction and operation of software as a service via the Internet.

In this type, the data center management company (11001) manages an OS (1100102) and runs and manages a data center (the cloud server (110011)) (1100103). Furthermore, the service provider (11002) manages an application (1100201). The service provider (11002), for example, performs processing corresponding to the convolution processing unit 12 and the subsampling unit 13 that are parts of the classifier 10 and provides the information compatible with the service to the user (1100204) by using an OS (1100102) managed by the data center management company and the application (1100201) managed by the service provider (11002).

Service Type 4: SaaS Type

Figure 17:
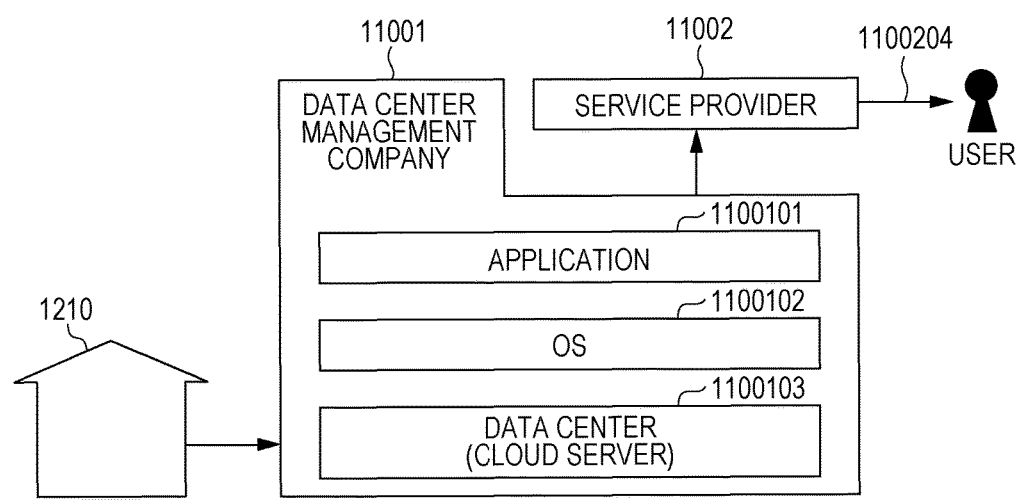
FIG. 17 is a diagram for explaining an example of a service type.

FIG. 17 is a diagram for explaining an example of a service type.

Specifically, FIG. 17 illustrates Service Type 4 (SaaS Type). SaaS is an abbreviation of Software as a Service. For example, SaaS is a cloud service providing model that allows a company or an individual (a user) that does not have a data center to use an application provided by a platform provider that has a data center (a cloud server) over a network such as the Internet.

In this type, the data center management company (11001) manages an application (1100101) and an OS (1100102) and runs and manages a data center (the cloud server (110011)) (1100103). The service provider 120, for example, performs processing corresponding to the convolution processing unit 12 and the subsampling unit 13 that are parts of the classifier 10 and provides information compatible with a service to a user (1100204) by using the OS (1100102) and the application (1100101) managed by the data center management company (11001).

In any of the types described above, it is assumed that the service provider 11002 provides the information compatible with the service to the user. For example, the service provider or the data center management company may develop an OS, an application, a database for big data, or the like by itself or may outsource development of an OS, an application, a database for big data, or the like to a third party.

Note that the present disclosure further include the following cases.

(1) Each of the devices described above is a computer system that is constituted by a microprocessor, a ROM, a RAM, a hard disc unit, a display unit, a keyboard, a mouse, and the like. Computer programs are stored in the RAM or the hard disc unit. The microprocessor operates in accordance with the computer programs. Thus, each of the devices accomplishes functions thereof. Each of the computer programs is made up of a plurality of command codes indicative of a command for a computer so that a predetermined function is accomplished.

(2) One or more of the constituent elements constituting each of the devices described above may be realized by a single system LSI (Large Scale Integration). The system LSI is a super-multifunctional LSI produced by integrating a plurality of elements on a single chip. Specifically, the system LSI is a computer system including a microprocessor, a ROM, a RAM, and the like. A computer program is stored in the RAM. The microprocessor operates in accordance with the computer program. Thus, the system LSI accomplishes functions thereof.

(3) One or more of the constituent elements constituting each of the devices described above may be realized by an IC card that can be attached to and detached from the device or a stand-alone module. The IC card or the module is a computer system constituted by a microprocessor, a ROM, a RAM, and the like. The IC card or the module may include the super-multifunctional LSI. The microprocessor operates in accordance with a computer program. Thus, the IC card or the module accomplishes functions thereof. The IC card or the module may have tamper resistance.

(4) The present disclosure may be the methods described above. The present disclosure may be a computer program that achieves these methods by a computer or may be a digital signal made up of the computer program.

(5) The present disclosure may be a computer-readable non-transitory recording medium such as a flexible disc, a hard disc, a CD-ROM, an MO, a DVD, a DVD-ROM, a DVD-RAM, a BD (Blu-ray (Registered Trademark) Disc), or a semiconductor memory, in which the computer program or the digital signal is stored. Alternatively, the present disclosure may be the digital signal stored in these recording media.

The present disclosure may be the computer program or the digital signal transmitted via an electrical communication line, a wireless or wired communication line, a network represented by the Internet, data broadcasting, or the like.

The present disclosure may be a computer system including a microprocessor operating in accordance with the computer program and a memory storing therein the computer program.

The program or the digital signal may be executed by another independent computer system by recording the program or the digital signal on the recording medium and delivering the recording medium or by delivering the program or the digital signal over the network or the like.

(6) The embodiment and modifications thereof may be combined.

The present disclosure is applicable to an image recognition method, an image recognition device, and a program that can speedily and precisely recognize what an object included in an image is on the basis of the image, and is applicable to especially an image recognition method, an image recognition device, and a program using an image taken by an imaging device such as a digital camera, a movie camera, a surveillance camera, an on-board camera, or a wearable camera.

What is claimed is:

1. An image recognition method performed by a computer of an image recognition device, comprising:
    receiving an image;
    acquiring first processing result information including values of a first processing result of first convolution processing at positions of a plurality of pixels that constitute the image by performing the first convolution processing on the image by using a first convolution filter;
    acquiring second processing result information including values of a second processing result of second convolution processing at positions of a plurality of pixels that constitute the image by performing the second convolution processing on the image by using a second convolution filter that is different from the first convolution filter in resolution, scale parameter or color to be processed;
    determining one feature for each of the positions of the plurality of pixels on the basis of the values of the first processing result and the second processing result at the positions of the plurality of pixels included in the first processing result information and the second processing result information and outputting the determined feature for each of the positions of the plurality of pixels;
    performing recognition processing on the basis of the determined feature for each of the positions of the plurality of pixels; and
    outputting recognition processing result information obtained by performing the recognition processing.

2. The image recognition method according to claim 1, wherein
   a resolution of the first convolution filter is higher than a resolution of the second convolution filter.

3. The image recognition method according to claim 1, wherein
   in the outputting the determined feature for each of the positions of the plurality of pixels, one feature for the position is determined by selecting, as the feature at the position, a maximum value among the values of the first processing result and the second processing result at the position, and outputting the determined feature for the position.

4. The image recognition method according to claim 1, wherein
   in the outputting the determined feature for each of the positions of the plurality of pixels, one feature for the position is determined by calculating a median or an average of the values of the first processing result and the second processing result at the position and determining the calculated value as the feature at the position, and outputting the determined feature at the position.

5. The image recognition method according to claim 1, wherein
   in the outputting the determined feature for each of the positions of the plurality of pixels, subsampling processing is performed for determining, for each region including a plurality of adjacent pixels, any of the features at positions of the plurality of pixels included in the region as a representative feature representing the region; and the recognition processing is performed on the basis of the representative feature determined in the subsampling processing.

6. The image recognition method according to claim 5, wherein
   in the subsampling processing, a feature whose value is largest among the features at the positions of the plurality of pixels included in the region is determined as the representative feature.

7. The image recognition method according to claim 1, wherein
   at least one of the receiving the image, the acquiring the first processing result information, the acquiring the second processing result information, the determining the one feature for each of the positions of the plurality of pixels and the outputting the determined feature for each of the positions of the plurality of pixels, the performing the recognition processing and the outputting the recognition processing result information is performed by a processor provided in the computer of the image recognition device.

8. An image recognition device comprising:
   a processor; and
   a memory that stores a program,
   wherein, the program causes the processor to execute:
   receiving an image;
   acquiring first processing result information including values of a first processing result of first convolution processing at positions of a plurality of pixels that constitute the image by performing the first convolution processing on the image by using a first convolution filter;
   acquiring second processing result information including values of a second processing result of second convolution processing at positions of a plurality of pixels that constitute the image by performing the second convolution processing on the image by using a second convolution filter that is different from the first convolution filter in resolution, scale parameter or color to be processed;
   determining one feature for each of the positions of the plurality of pixels on the basis of the values of the first processing result and the second processing result at the positions of the plurality of pixels included in the first processing result information and the second processing result information and outputting the determined feature for each of the positions of the plurality of pixels;
   performing recognition processing on the basis of the determined feature for each of the positions of the plurality of pixels that is output; and
   outputting recognition processing result information obtained by performing the recognition processing.

9. The image recognition method according to claim 8, wherein
   a resolution of the first convolution filter is higher than a resolution of the second convolution filter.

10. The image recognition method according to claim 8, wherein
   in the outputting the determined feature for each of the positions of the plurality of pixels, one feature for the position is determined by selecting, as the feature at the position, a maximum value among the values of the first processing result and the second processing result at the position, and outputting the determined feature for the position.

11. The image recognition method according to claim 8, wherein
   in the outputting the determined feature for each of the positions of the plurality of pixels, one feature for the position is determined by calculating a median or an average of the values of the first processing result and the second processing result at the position and determining the calculated value as the feature at the position, and outputting the determined feature at the position.

12. The image recognition method according to claim 8, wherein
   in the outputting the determined feature for each of the positions of the plurality of pixels, subsampling processing is performed for determining, for each region including a plurality of adjacent pixels, any of the features at positions of the plurality of pixels included in the region as a representative feature representing the region; and the recognition processing is performed on the basis of the representative feature determined in the subsampling processing.

13. The image recognition method according to claim 12, wherein
   in the subsampling processing, a feature whose value is largest among the features at the positions of the plurality of pixels included in the region is determined as the representative feature.

14. The image recognition method according to claim 8, wherein
   at least one of the receiving the image, the acquiring the first processing result information, the acquiring the second processing result information, the determining the one feature for each of the positions of the plurality of pixels and the outputting the determined feature for each of the positions of the plurality of pixels, the performing the recognition processing and outputting the recognition processing result information is performed by a processor provided in the computer of the image recognition device.

15. A non-transitory computer-readable recording medium storing a program for causing a computer of an image recognition device to:
receive an image;
acquire first processing result information including values of a first processing result of first convolution processing at positions of a plurality of pixels that constitute the image by performing the first convolution processing on the image by using a first convolution filter;
acquire second processing result information including values of a second processing result of second convolution processing at positions of a plurality of pixels that constitute the image by performing the second convolution processing on the image by using a second convolution filter that is different from the first convolution filter in resolution, scale parameter or color to be processed;
determine one feature for each of the positions of the plurality of pixels on the basis of the values of the first processing result and the second processing result at the positions of the plurality of pixels included in the first processing result information and the second processing result information and output the determined feature for each of the positions of the plurality of pixels;
perform recognition processing on the basis of the determined feature for each of the positions of the plurality of pixels; and
output recognition processing result information obtained by performing the recognition processing.

16. The image recognition method according to claim 15, wherein
a resolution of the first convolution filter is higher than a resolution of the second convolution filter.

17. The image recognition method according to claim 15, wherein
in the output of the determined feature for each of the positions of the plurality of pixels, one feature for the position is determined by selecting, as the feature at the position, a maximum value among the values of the first processing result and the second processing result at the position, and outputting the determined feature for the position.

18. The image recognition method according to claim 15, wherein
in the output of the determined feature for each of the positions of the plurality of pixels, one feature for the position is determined by calculating a median or an average of the values of the first processing result and the second processing result at the position and determining the calculated value as the feature at the position, and outputting the determined feature at the position.

19. The image recognition method according to claim 15, wherein
in the output of the determined feature for each of the positions of the plurality of pixels, subsampling processing is performed for determining, for each region including a plurality of adjacent pixels, any of the features at positions of the plurality of pixels included in the region as a representative feature representing the region; and the recognition processing is performed on the basis of the representative feature determined in the subsampling processing.

20. The image recognition method according to claim 19, wherein
in the subsampling processing, a feature whose value is largest among the features at the positions of the plurality of pixels included in the region is determined as the representative feature.

* * * * *